(12) United States Patent
Eschbach (10) Patent No.: US 9,729,410 B2
(45) Date of Patent: Aug. 8, 2017

(54) METHOD AND SYSTEM FOR CAPTURING WEB CONTENT FROM A WEB SERVER

(71) Applicant: Jeffrey T Eschbach, Chicago, IL (US)

(72) Inventor: Jeffrey T Eschbach, Chicago, IL (US)

( * ) Notice: Subject to any disclaimer, the term of this patent is extended or adjusted under 35 U.S.C. 154(b) by 215 days.

(21) Appl. No.: 14/062,471

(22) Filed: Oct. 24, 2013

(65) Prior Publication Data

US 2015/0120804 A1    Apr. 30, 2015

(51) Int. Cl.
| | | |
|---|---|---|
| *G06F 15/16* | (2006.01) | |
| *H04L 12/26* | (2006.01) | |
| *H04L 29/08* | (2006.01) | |
| *G06F 12/00* | (2006.01) | |
| *H04L 29/06* | (2006.01) | |

(52) U.S. Cl.
CPC ........ *H04L 43/04* (2013.01); *H04L 29/08072* (2013.01); *H04L 63/306* (2013.01); *H04L 67/2842* (2013.01); *H04L 63/1408* (2013.01); *H04L 67/02* (2013.01); *H04L 67/08* (2013.01)

(58) Field of Classification Search
CPC combination set(s) only.
See application file for complete search history.

(56) References Cited

U.S. PATENT DOCUMENTS

| | | | |
|---|---|---|---|
| 5,781,629 A | | 7/1998 | Haber et al. |
| 6,138,158 A * | | 10/2000 | Boyle ................ H04L 67/02 709/206 |
| 6,356,934 B1 * | | 3/2002 | Delph ............... G06F 17/30873 707/E17.111 |
| 6,792,545 B2 | | 9/2004 | Mccreight et al. |
| 7,107,309 B1 * | | 9/2006 | Geddes ............... H04L 67/2804 709/203 |
| 7,370,035 B2 | | 5/2008 | Gross et al. |
| 7,424,510 B2 | | 9/2008 | Gross et al. |
| 7,496,559 B2 | | 2/2009 | Gross et al. |
| 7,693,956 B2 | | 4/2010 | Moricz |

(Continued)

FOREIGN PATENT DOCUMENTS

| | | |
|---|---|---|
| CN | 102355459 A | 2/2012 |
| GB | 2478554 A | 9/2011 |

(Continued)

OTHER PUBLICATIONS

David W. Hagy, Investigations Involving the Internet and Computer Networks, National Institute of Justice Special Report, Jan. 2007, U.S. Department of Justice, Washington DC, USA.

(Continued)

*Primary Examiner* — Zarni Maung
(74) *Attorney, Agent, or Firm* — Valerie M. Davis; The Mason Group Patent Specialists LLC (57) ABSTRACT

A method and system for capturing web content from a web server includes a capturing server establishing an active link between a client device and the capturing server that allows the client device to remotely control an active web browsing session, between the capturing server and the web server, to select web content. The method also includes establishing the active web browsing session between the capturing server and the web server. The capturing server further receives the web content from the web server, without the web content being routed through the client device, and captures the web content.

20 Claims, 6 Drawing Sheets

(56) References Cited

U.S. PATENT DOCUMENTS

| | | | |
|---|---|---|---|
| 7,801,945 B1* | 9/2010 | Geddes | G06F 17/30899 709/203 |
| 7,945,914 B2 | 5/2011 | Hasiuk et al. | |
| 7,966,350 B2 | 6/2011 | Levine et al. | |
| 7,970,647 B2* | 6/2011 | Koeppel | G06Q 30/02 705/14.1 |
| 8,019,741 B2 | 9/2011 | Gross et al. | |
| 8,037,182 B2 | 10/2011 | Smyth et al. | |
| 8,065,414 B2 | 11/2011 | Anastas et al. | |
| 8,171,108 B2 | 5/2012 | Shannon et al. | |
| 8,566,903 B2 | 10/2013 | Kisin et al. | |
| 8,661,090 B2* | 2/2014 | Fainberg | G06F 17/30902 709/203 |
| 9,042,713 B2* | 5/2015 | Corn | H04N 1/00132 348/207.1 |
| 2001/0047400 A1 | 11/2001 | Coates et al. | |
| 2001/0052003 A1* | 12/2001 | Seki | G06F 17/30902 709/219 |
| 2002/0071192 A1 | 6/2002 | Deblanc et al. | |
| 2002/0091721 A1* | 7/2002 | Mcbride | G06F 17/3089 |
| 2002/0198882 A1* | 12/2002 | Linden | G06F 17/30867 |
| 2003/0023664 A1 | 1/2003 | Elmer | |
| 2003/0091166 A1* | 5/2003 | Hershenson | G06F 17/30876 379/88.17 |
| 2003/0187956 A1* | 10/2003 | Belt | H04L 67/2823 709/219 |
| 2004/0260733 A1 | 12/2004 | Adelstein et al. | |
| 2007/0011450 A1 | 1/2007 | McCreight et al. | |
| 2007/0022296 A1 | 1/2007 | Caverly et al. | |
| 2009/0070306 A1* | 3/2009 | Stroe | G06F 17/30887 |
| 2009/0089361 A1 | 4/2009 | Womack et al. | |
| 2009/0132640 A1 | 5/2009 | Verma et al. | |
| 2009/0165142 A1 | 6/2009 | Adelstein et al. | |
| 2009/0204610 A1 | 8/2009 | Hellstrom et al. | |
| 2010/0057864 A1 | 3/2010 | Laird-McConnell | |
| 2011/0041058 A1 | 2/2011 | Butler et al. | |
| 2011/0061091 A1* | 3/2011 | Wheeler | G06Q 10/00 726/3 |
| 2011/0150362 A1* | 6/2011 | Mitra | H04N 1/00228 382/286 |
| 2011/0179378 A1* | 7/2011 | Wheeler | G06F 17/3089 715/780 |
| 2011/0231478 A1* | 9/2011 | Wheeler | G06F 17/30864 709/203 |
| 2011/0264677 A1 | 10/2011 | Hermitage et al. | |
| 2012/0221633 A1 | 8/2012 | Adelstein et al. | |
| 2012/0290847 A1 | 11/2012 | O'Connor et al. | |
| 2013/0055114 A1* | 2/2013 | Lev | H04W 4/001 715/760 |
| 2013/0166777 A1 | 6/2013 | Chen et al. | |
| 2013/0212689 A1 | 8/2013 | Ben-Natan et al. | |
| 2014/0173417 A1 | 6/2014 | He | |

FOREIGN PATENT DOCUMENTS

| | | |
|---|---|---|
| JP | 2005332188 A | 12/2005 |
| WO | 2002071192 A2 | 9/2002 |
| WO | 2011139583 A1 | 11/2011 |

OTHER PUBLICATIONS

Depot-web.com is a service of legal Web capture.
Shane Thomas, PCT International Search Report, Apr. 6, 2015, Alexandria, Virginia, United States of America.
Shane Thomas, PCT Written Opinion of the International Searching Authority, Apr. 6, 2015, Alexandria, Virginia, United States of America.
Wayback Engine library of archived websites.
NPL_www_archive_org.
NPL_www_archivesocial_com.
NPL_www_awesomescreenshot_com.
NPL_www_backupify_com.
NPL_www_cloudpreservation_nextpoint_com.
NPL_www_dei_ca.
NPL_www_digistamp_com.
NPL_www_es_wikipedia_org.
NPL_www_evernote_com.
NPL_www_freezepage_com.
NPL_www_globalcolleague_com.
NPL_www_nextpoint_com.
NPL_www_pagefreezer_com.
NPL_www_sertify_com.
NPL_www_surety_com.
NPL_www_symantec_com.
NPL_www_techsmith_com.
NPL_www_trademarkia_com.
NPL_www_veresoftware_com.
NPL_www_verisign_com.
NPL_www_x1_com.

* cited by examiner

METHOD AND SYSTEM FOR CAPTURING WEB CONTENT FROM A WEB SERVER

FIELD OF THE DISCLOSURE

The present disclosure relates generally to capturing web content from a web server and more particularly to a client device actively controlling the remote capture of web content from a web server.

BACKGROUND

As the proliferation of computer technology increases, so does the volume of data that is shared electronically over computer networks. Presently, digital media is already the dominant format by which information is disseminated, and the Internet continues to grow exponentially. For the most part, web content that exists in the cloud is beneficial, but as with all things, there is a portion that foments controversy. With increasing frequency, web content is playing a role in judicial proceedings, often in support of, or as the focus of, litigation. In either case, it becomes necessary to gather web content to serve as evidence for trials. An e-mail, for example, might prove the existence or terms of a contract; a YouTube video might provide proof of criminal behavior; a defamatory post might provide proof of injury; or a product webpage might provide proof of trademark infringement.

With the capture of web content for evidentiary purposes still in its infancy, capturing and archiving a wide variety of content that is based on diverging technology standards presents difficulties that need to be overcome. Further complicating matters are stringent requirements codified by different judicial bodies at the federal, state, and local levels regarding the qualification of submitted evidence. Electronic evidence must be properly authenticated, and the method by which it is obtained must provide acceptable assurances of data integrity. Accordingly, there is a need of a method and system for capturing web content from a web server.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and system for capturing web content from a web server. More specifically, the method and system allow for capturing the web content under the direction of a client device while maintaining data integrity by excluding the client device from the chain of custody for the captured web content. Excluding the client device from the chain of custody for captured web content, as used herein, means that the capturing server captures web content from a data stream that carries the content from the web server before the data stream reaches the client device. In accordance with the teachings herein, a method performed by a capturing server includes establishing an active link between a client device and the capturing server that allows the client device to remotely control an active web browsing session, between the capturing server and the web server, to select web content. The method also includes establishing the active web browsing session between the capturing server and the web server. The capturing server further receives the web content from the web server, without the web content being routed through the client device, and captures the web content.

Also in accordance with the teachings herein, a method performed by a capturing server includes establishing a first active link between the capturing server and a client device that concurrently has an active web browsing session with the web server and establishing a second active link between the capturing server and the web server. The method additionally includes receiving a request for web content from the client device over the first active link, wherein the web content was selected using the active web browsing session, and routing the request for the web content to the web server over the second active link. The method also includes receiving the web content from the web server over the second active link, capturing the web content, and routing the web content to the client device over the first active link.

Further in accordance with the teachings herein, a method performed by a capturing server includes establishing a first web browsing session between a client device and the capturing server and establishing a second web browsing session between the capturing server and the web server, wherein the first and second web browsing sessions are running simultaneously. The method also includes receiving a first request for web content from the client device using the first web browsing session, wherein the web content is stored on the web server and sending a second request for the web content to the web server using the second web browsing session. The capturing server further receives the web content from the web server using the second web browsing session, captures the web content, and sends the web content to the client device using the first web browsing session.

A system for securely capturing web content consistent with the teachings herein has a capturing server that includes at least one network interface configured to establish a first active link between the capturing server and the client device and a second active link between the capturing server and the web server, wherein the second active link is used for receiving web content requested in real time using the client device. The capturing server also includes a processing element configured to capture the web content using a capture mechanism comprising at least one of: a remote control protocol implemented over the first active link that enables the client device to remotely control a first web browsing session between the capturing server and the web server; a second web browsing session established between the client device and the web server over the first and second active links; or a third web browsing session established between the client device and the capturing server over the first active link and a fourth web browsing session established between the capturing server and the web server over the second active link. The system further includes non-volatile storage configured to store the captured web content remotely from the client device.

Figure 1:
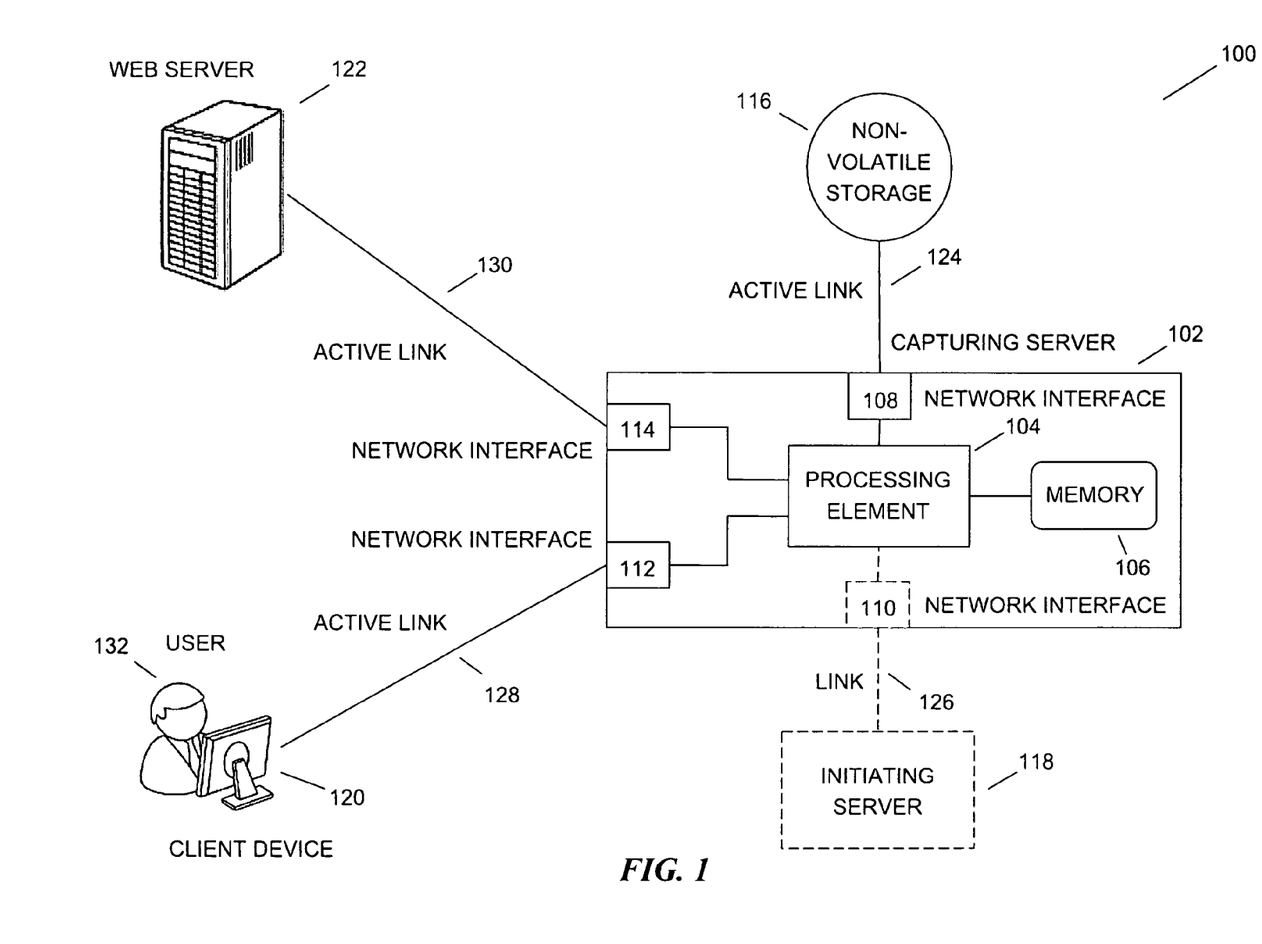
FIG. 1 is a block diagram of a system for capturing web content in accordance with some embodiments of the present teachings.

Referring now to the drawings, and in particular FIG. 1, a web content capturing system (also referred to herein as a capturing system or simply a system) consistent with some embodiments of the present teachings is shown and indicated generally at 100. The capturing system 100 includes a capturing server 102, a client device 120, a web server 122, non-volatile storage 116, and an optional initiating server 118. The capturing server 102 includes: a processing element 104, memory 106, and network interfaces 108, 110, 112, 114. As shown, the capturing server 102 is coupled from the network interfaces 112, 114, and 108 to similar interfaces on the client device 120, the web server 122, and the non-volatile storage 116 by the active links 128, 130, and 124, respectively. In an optional configuration, the capturing server 102 is also coupled from the network interface 110 to the initiating server 118 by a link 126.

A limited number of system and server elements 102, 104, 106, 108, 110, 112, 114, 116, 118, 120, 122, 124, 126, 128, 130 are shown at 100 for ease of illustration, but other embodiments may include a lesser or greater number of such elements in a system or server of the system. Moreover, other elements needed for a commercial embodiment of a system or server that incorporates the elements shown at 100 are omitted from FIG. 1 for clarity in describing the enclosed embodiments.

We now turn to a brief description of the elements 102 and 116, 118, 120, 122, 124, 126, 128, 130 within the system 100 and of the elements 106, 108, 110, 112, 114 within the capturing server 102. In general, the capturing server 102, or more specifically, the processing element 104 within the capturing server 102, is configured with functionality in accordance with embodiments of the present disclosure as described in detail below with respect to the remaining figures. "Adapted," "operative," "capable" or "configured," as used herein, means that the indicated elements are implemented using one or more hardware devices such as one or more operatively coupled processing cores, memory devices, and interfaces, which may or may not be programmed with software and/or firmware as the means for the indicated elements to implement their desired functionality. Such functionality is supported by the other hardware shown in FIG. 1, including the device elements 106, 108, 110, 112, 114, 116, 118, 120, 122, 124, 126, 128, 130.

The processing element 104 represents one or more processing cores and includes arithmetic logic and registers necessary to perform the digital processing required by the capturing server 102 to capture web content and operate in a manner consistent with the embodiments described herein. For a particular embodiment, the processing element 104 is implemented as a system-on-chip (SoC).

The memory 106 provides temporary storage of electronic data used by the processing element 104 in performing its functionality. For one embodiment, the memory 106 represents random access memory (RAM). For other embodiments, the memory 106 represents volatile or non-volatile memory used by the processing element 104 to cache data.

The network interfaces 108, 110, 112, 114 are points of interconnection that couple the capturing server 102 to the network or networks to which the non-volatile storage 116, the optional initiating server 118, the client device 120, and the web server 122, respectively, are connected. In an embodiment with fewer network interfaces, one or more network interfaces are shared among two or more of the elements 116, 118, 120, 122. The network interfaces 108, 110, 112, 114 can be wireless interfaces, wired interfaces, or a combination of the two. An example of a wireless network interface is a wireless local area network (WLAN) transceiver. An example of a wired interface is a category 5 (CAT5) cable socket.

The links 124, 126, 128, 130 represent "communication conduits" between elements of the capturing system 100, or more specifically, the wired or wireless connections (e.g., Ethernet connections) that allow coupled elements to exchange data and/or control signals. Each link can be a single connection or include multiple connections of varying types. Multiple connections, for example, can create a chain of intermediary devices such as base stations, access points, or other network devices (not shown) that form a link shown between two elements of the system 100. The connections, in turn, utilize one or more technologies to communicate data and/or control signals. These technologies can include, but are not limited to: Worldwide Interoperability for Microwave Access (WiMAX), Wi-Fi, fourth-generation Long Term Evolution (4G LTE), fixed wireless (e.g., Motorola Canopy), Integrated Services Digital Network (ISDN), Broadband ISDN (B-ISDN), Digital Subscriber Line (DSL), and Synchronous Optical Networking (SONET).

Under the direction of the client device 120, while the client device 120 is being operated by a user such as a user 132 (also referred to herein as a subscriber), the capturing server 102 is configured to capture web content being hosted by the web server 122 and to store the captured web content using the non-volatile storage 116. Web content is defined herein as data that is accessible to a computer or computing device that is connected to a network of computing devices, or a network of such networks (e.g., the Internet). Web content includes textual, visual, and/or aural data that is formatted and hosted by one or more content servers (e.g., the web server 122). Web content includes, but is not limited to, data that is formatted as: documents, applications, pictures, videos, movies, music, e-services, and/or e-mails. In some instances, web content is integrated into one or more interactive documents (e.g., webpages) that are hosted by a content server and browsable by a client device.

As used herein, web content includes both deep web content and surface web content. Deep web content is not crawlable (i.e., cannot be found by programs commonly referred to as web bots, crawlers, or spiders) and thus not indexed by standard search engines such as Google or Yahoo!. In one instance, deep web content is stored in searchable databases that only produce results dynamically in response to a direct request from an authorized client. For example, a bank server will only provide an account balance to an account holder who has been authenticated through the use of a password and a personal identification number (PIN). In another instance, deep web content is dynamically generated in response to interactive input. For instance, an algorithm run by a content server may provide diagnostic information to a mechanic who provides responses to a series of preprogrammed inquiries.

Facebook, Twitter, and LinkedIn serve as examples of social media sites that include deep web content. A user browsing to a social media site might access deep web content by "clicking" a radio button, entering text into a field, expanding content so hidden text becomes visible, or scrolling to generate more displayed content (e.g., expand a timeline in Facebook). As used herein, clicking means to select using a mouse, stylus, or other input device (e.g., tapping a touch screen using a finger).

In contrast to deep web content, surface web content is static content hosted by a content server that is indexable by standard search engines and accessible to a web browser (also referred to herein simply as a browser) executing on a client device through the use of a uniform resource locator (URL) without the need for further interaction. For example, navigating to the URL www.whitehouse.gov brings up a static webpage that displays surface web content relating to the office of the President. Any additional web content requiring further user input to obtain and display within the webpage represents deep web content.

It is the client device 120 that directs the capturing server 102 to the web content that is captured. Consistent with embodiments in accordance with the present teachings, the client device 120 is any device capable of establishing a network connection and browsing web content hosted by a content server. Examples of client devices include, but are not limited to: desktop computers, laptops, tablets, phablets, smartphones, wearable computing devices, personal digital assistants (PDAs), and Internet-capable televisions.

It is the web server 122 that hosts web content that is captured. The web server 122 is any device capable of establishing a network connection and hosting web content that it provides to other networked devices, such as the capturing server 102 or the client device 120, in response to requests received from those devices. In one embodiment, the web server 122 represents one or more dedicated machines or scalable structures that host commercial, educational, or governmental web content. In another embodiment, the web server 122 represents a personal computer that, through the installation of specialized software (e.g., Apache HTTP Server), hosts a personal webpage. In a further embodiment, the web server 122 provides a virtual gaming environment that allows geographically separated users to participate in a shared gaming experience.

The non-volatile storage 116 provides the capturing server 102 with long-term storage for the web content it captures from the web server 122 and other content servers. For different embodiments, the non-volatile storage 116 is a magnetic (e.g., hard drive or tape), solid state (e.g., flash memory), or optical (e.g., holographic) storage device. In some embodiments, the non-volatile storage 116 is co-located with or physically integrated into the capturing server 102. In other embodiments, the non-volatile storage 116 is remote to (not co-located with) the capturing server 102, as shown. In further embodiments, the non-volatile storage 116 represents multiple storage devices of the same or different types that are located together or apart from one another. For all embodiments, the non-volatile storage 116 is remote to (located apart from) the client device 120.

The term "capture" as used herein refers to the capturing server 102 storing a copy of web content hosted by the web server 122, or other content server, to the non-volatile storage 116. In one embodiment, the capturing server 102 captures web content from multiple webpages. In another embodiment, the capturing server 102 captures web content from multiple web servers, for example, when the multiple webpages are hosted by different web servers. In a further embodiment, the capturing server 102 uses Hypertext Transfer Protocol (HTTP) and/or File Transfer Protocol (FTP) to get web content for capture from the web server 122. For additional embodiments, capturing web content includes storing the web content with additional information, such as metadata, which is described in more detail below with reference to FIG. 3. Capturing a webpage can include the capturing server 102 storing a "snapshot" of the entire webpage, along with all the underlying files used to create the webpage, or it might only include the capturing server 102 storing a portion of the webpage being actively displayed by the client device 120. Web content that is captured by the capturing server 102 is made available for later viewing by authorized users. For example, an authorized user recalls captured web content, upon entering his password, through a publically available URL using any Internet-accessible client device.

The client device 120 directs the capturing server 102 to the web content using the active link 128; the capturing server 102 receives the web content using the active link 130; and the capturing server 102 stores the web content using active link 124. Each of the links 128, 130, and 124 is specified as an active link within the capturing system 100. The links 128, 130, and 124 are also referred to herein as the first 128, second 130, and third 124 active links, respectively. The "active" designation indicates that these links are used simultaneously or in succession to one another, allowing the capturing server to perform its described functionality in real time (as it is being directed by the client device 120).

In one embodiment, an active link between devices is established when the devices have exchanged the proper messaging to do so in accordance with a given communication protocol that the devices are implementing. Similarly, the link is taken or torn down by the requisite protocol signaling. In a further embodiment, the link is established to support a web browsing session between the devices. A web browsing session between devices is defined to be an active web browsing session during the time a link between the two devices is being used to support the web browsing session between the time the link is established and the time the link is taken down.

Notwithstanding normal network delays associated with limited bandwidth or loaded servers, for example, the capturing server 102 does not queue web content specified by the client device 120 for later capture (e.g., a capture scheduled for a particular time or executed after a waiting period of minutes or hours). The capturing server 102 receives web content as it is directed to the web content by the client device 120, and the capturing server 102 captures the web content when it is instructed to capture the web content by the client device 120.

For a particular embodiment, the capturing server 102 captures web content in real time by storing the web content to the non-volatile storage 116 at the same time the web content is made available for display at the client device 120. In another embodiment, the capturing server 102 does queue web content specified by the client device 120 for later capture but the capturing server 102 captures the specified web content while the active link 128 is established. In other words, the capturing server 102 captures the specified web content during the capturing session between the client device 120 and the capturing server 102, before the active link 128 is taken down.

For several embodiments, the optional initiating server 118 is configured to initialize the capturing server 102 and to provide a set of identifiers to at least one of the capturing server 102, the client device 120, or the non-volatile storage 116. The set of identifiers is configured to allow the establishment of the first active link 128, between the capturing server and the client device, and the third active link 124, between the capturing server 102 and a portion of the non-volatile storage 116. Some embodiments relate to multiple client devices directing the capture of different web content from multiple web servers. A first client device (e.g., client device 120) might be directing the capture of web content from a first web server (e.g., web server 122) for a trademark infringement case while a second client device is directing the capture of different web content from a second web server for use in a defamation lawsuit. For multiple client devices, a single capturing server (e.g., capturing server 102) might capture the web content it is directed to by the multiple client devices. Alternatively, separate capturing servers, one for each client device, might be used within the system 100 so that each capturing server captures only the web content it is directed to by a single client device.

For embodiments where there is a one-to-one correspondence between capturing servers and client devices, the initiating server 118 initializes a capturing server for each client device as the need arises. For example, the initiating server 118 initializes a capturing server as the client device 120 logs on to or otherwise identifies to the initiating server 118 its intent to use the system 100 to capture web content. From an Internet Protocol (IP) address or login information, the initiating server 118 recognizes that the client device 120 or a user of device 120, respectively, is associated with a subscriber who is authorized (e.g., through a paid subscription) to use the system 100 to capture web content. The initiating server 118 is also aware of the non-volatile storage 116, and any portion of it that is allocated to store captured web content for the client device 120. That portion of the non-volatile storage 116, for example, might be identified by a particular geographic storage location, a particular disk or sector at that location, and/or a particular directory of the non-volatile storage 116.

For a particular embodiment, the initiating server 118 initializes the capturing server 102 when the initiating server 118 receives an indication that the client device 120 is ready to use the capturing system 100 to capture web content. For example, the indication is provided when the client device 120 initiates a capture mode. The initiating server 118, using an Internet connection (not shown) initializes the capturing server 102 by creating a virtual machine using a service that hosts virtual machines, which run in the cloud. Cloud computing refers to computational resources that are provided by a third party and made available over one or more Internet connections. Google Cloud Platform (GCP), for example, allows for the creation of virtual machines using Google's infrastructure. Amazon Elastic Compute Cloud (EC2) and Windows Azure also allow for the creation of virtual machines using Amazon's and Microsoft's cloud computing platforms, respectively.

The virtual machine the initiating server 118 creates in the cloud for the client device 120 becomes the capturing server 102, which runs its own operating system independently from other virtual machines the initiating server 118 creates for other client devices. For an embodiment, the initiating server 118 also provides software for execution on the virtual machine that allows the virtual machine to perform its functionality as described herein. For an embodiment where the capturing server 102 is a virtual machine, the hardware elements 108, 110, 112, 114 used by the capturing server 102 represent hardware elements of the platform hosting the virtual machine (e.g., hardware elements within the Google, Amazon, or Microsoft servers).

After the initiating server 118 initializes the capturing server 102 by creating it as a virtual machine, or making it ready for use if already created, the initiating server 118 provides identifiers to one of or a combination of the capturing server 102, the client device 120, and/or the non-volatile storage 116. This allows the capturing server 102, the client device 120, and the non-volatile storage 116 to couple by forming the links 128 and 124, enabling the capturing system 100 to perform its described functionality. The capturing server 102 creates the link 130 as the client device 120 directs the capturing server 102 to web content hosted by the web server 122.

For one embodiment, the initiating server 118 provides the client device 120 with an identifier (e.g., an IP address) for the capturing server 102. Responsively, the client device 120 initiates the link 128 with the capturing server 102. For another embodiment, the capturing server 102 receives an identifier for the client device 120 from the initiating server 118 and responsively initiates the link 128. Analogously, the link 124 between the capturing server 102 and the non-volatile storage 116 is initiated by each of the two elements in different embodiments.

For some embodiments, the initiating server 118 creates a number of virtual machines before they are needed by client device. This creates "headroom" within the capturing system 100 that allows the system 100 to respond faster when a virtual machine is needed by a client device. As the capturing server 102 is created as a virtual machine when needed by the client device 120, it is also taken down again when it is no longer needed by the client device 120. For a particular embodiment, virtual machines are not reused. Providing each client device with its own newly created capturing server with fresh software ensures a higher level of security against hacking, data manipulation, malicious code, and other undesirable occurrences. This results in greater data integrity for at least three capture mechanisms used by the capturing servers in different embodiments. In an alternate embodiment, virtual machines are reused but only by the same subscriber (e.g., as identified by an IP address or login information). This allows the virtual machine to retain and use subscriber-specific information for future capturing sessions. Always assigning a virtual machine back to the same subscriber greatly reduces the chance of an unauthorized user having access to the virtual machine before, during, or after a capturing session.

Figure 2:
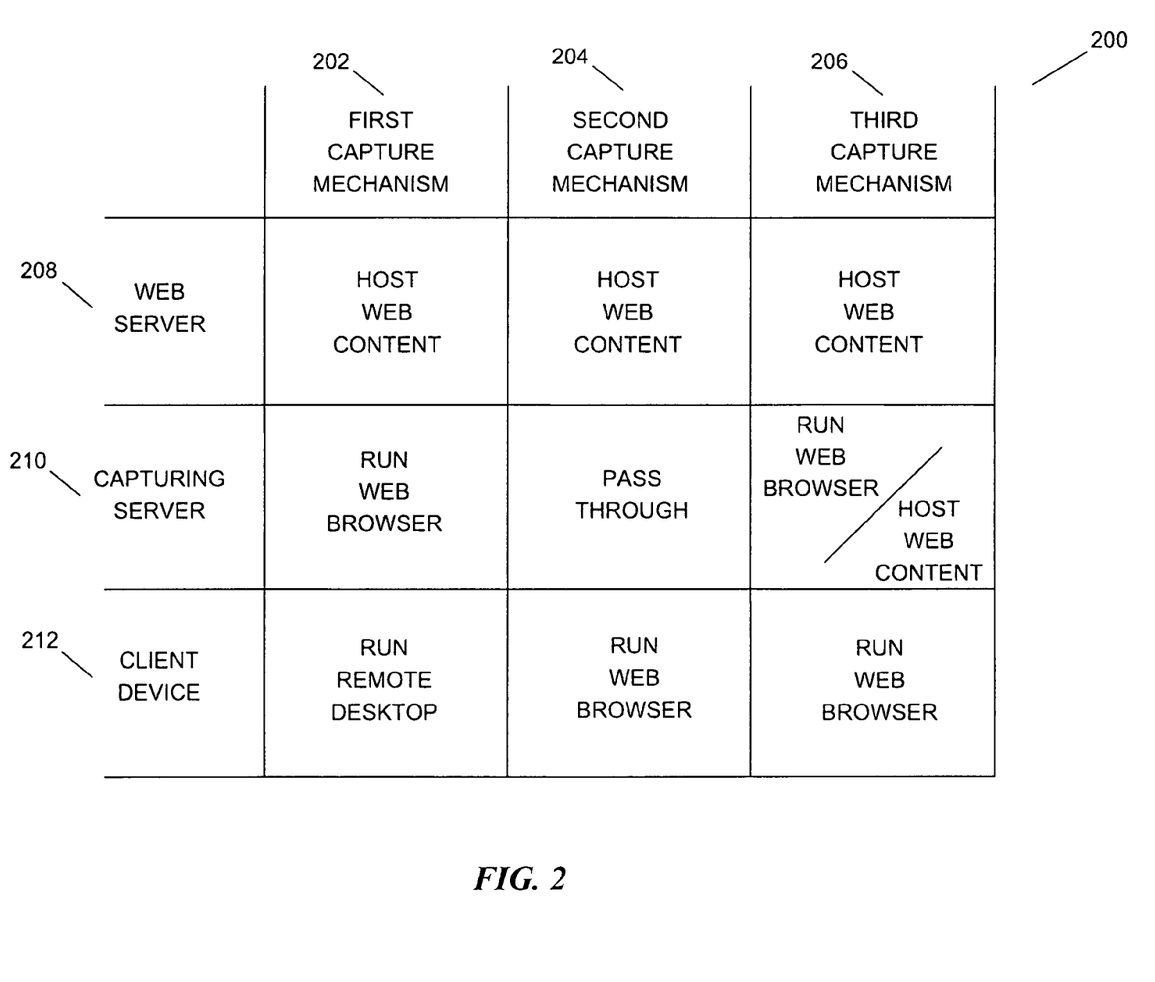
FIG. 2 is a table of capture mechanisms used by the system in accordance with some embodiments of the present teachings.

We turn now to a detailed description of the functionality of the system elements shown in FIG. 1 in accordance with the teachings herein and by reference to the remaining figures. FIG. 2 shows a table, indicted at 200, illustrating a general overview of the functionality performed by the web server 122, the capturing server 102, and the client device 120 for three capture mechanisms used in separate embodiments for which the capturing server 102 captures web content from the web server 122 under the direction of the client device 120. The table 200 includes a first 202, second 204, and third 206 column which represent the implementation of a first, second, and third capture mechanism, respectively. For each capture mechanism, a first 208, second 210, and third 212 row of the table 200 represent the general functionality performed by the web server 122, the capturing server 102, and the client device 120, respectively. For each of the three capture mechanisms shown, the web server 122 hosts the web content the capturing server 102 captures.

For the first capture mechanism, the client device 120 runs a remote desktop protocol, which is a remote control protocol or application that allows a user of the client device to remotely control a web browser running on the capturing server 102. In different embodiments, different remote desktop protocols may be used which are associated with different sets of standards and/or software manufacturers. A web browsing session is established between the capturing server 102 and the web server 122. For different embodiments, web browsing sessions support both the simple object access protocol (SOAP), the representational state transfer (REST) web service protocol, or other web "surfing" paradigms. A session is defined herein as a semi-permanent interactive information interchange or "dialog" between two computing devices to accomplish a specific objective, which in this case is web browsing. By this definition, a remote desktop session is also running between the client device 120 and the capturing server 102. The active link 128 supports the remote desktop session, which runs contemporaneously with the web browsing session, which is supported by the active link 130. Under the direction of the client device 120, the capturing server 102 browses the web content hosted by the web server 122. For an embodiment, the capturing server 102 captures the web content it receives from the web server 122 before sending the web content to the client device 120 for display on the desktop of the client device 120. A more detailed description of the first capture mechanism is given with reference to FIG. 3.

For the second capture mechanism, the client device 120 launches a web browser and establishes a web browsing session between itself and the web server 122, which is supported by the active links 128 and 130. Session traffic, which includes the web content hosted by the web server 122, is directed (i.e., routed) to pass through the capturing server 102. For an embodiment, the capturing server 102 captures the web content as it passes through the capturing server 102 from the web server 122 over the active link 130 on its way to the client device 120 over the active link 128. The second capture mechanism is described in greater detail with reference to FIG. 4.

For the third capture mechanism, the capturing server 102 executes both a web browser and a content server. In total, two web browsing sessions are running contemporaneously: a first web browsing session between the client device 120 and the capturing server 102, supported by the active link 128, and a second web browsing session between the capturing server 102 and the web server 122, supported by the active link 130. Also, both the web server 122 and the capturing server 102 host the same web content. As mentioned, the capturing server 102 executes a web browser (e.g., Firefox, Internet Explorer, Opera, Google Chrome, etc.) to browse the web server 122. The capturing server 102 also executes a content server (e.g., Apache HTTP Server, Nginx, Lighttpd, etc.) to host the web content it receives from the web server 122 for redisplay back down to the client device 120. Using the first web browsing session, the client device 120 browses the web content hosted by the capturing server 102. The webpages constructed by the capturing server 102 using its content server are recreations of the webpages hosted by the web server 122. As the client device selects (i.e., clicks on) links embedded within the webpages hosted by (the content server of) the capturing server 102, the capturing server 102 uses the second web browsing session to retrieve the selected content from the webpages hosted by the web server 122 and replicate the content in its own webpages. A more detailed description of the third capture mechanism is given with reference to FIG. 5.

Figure 3:
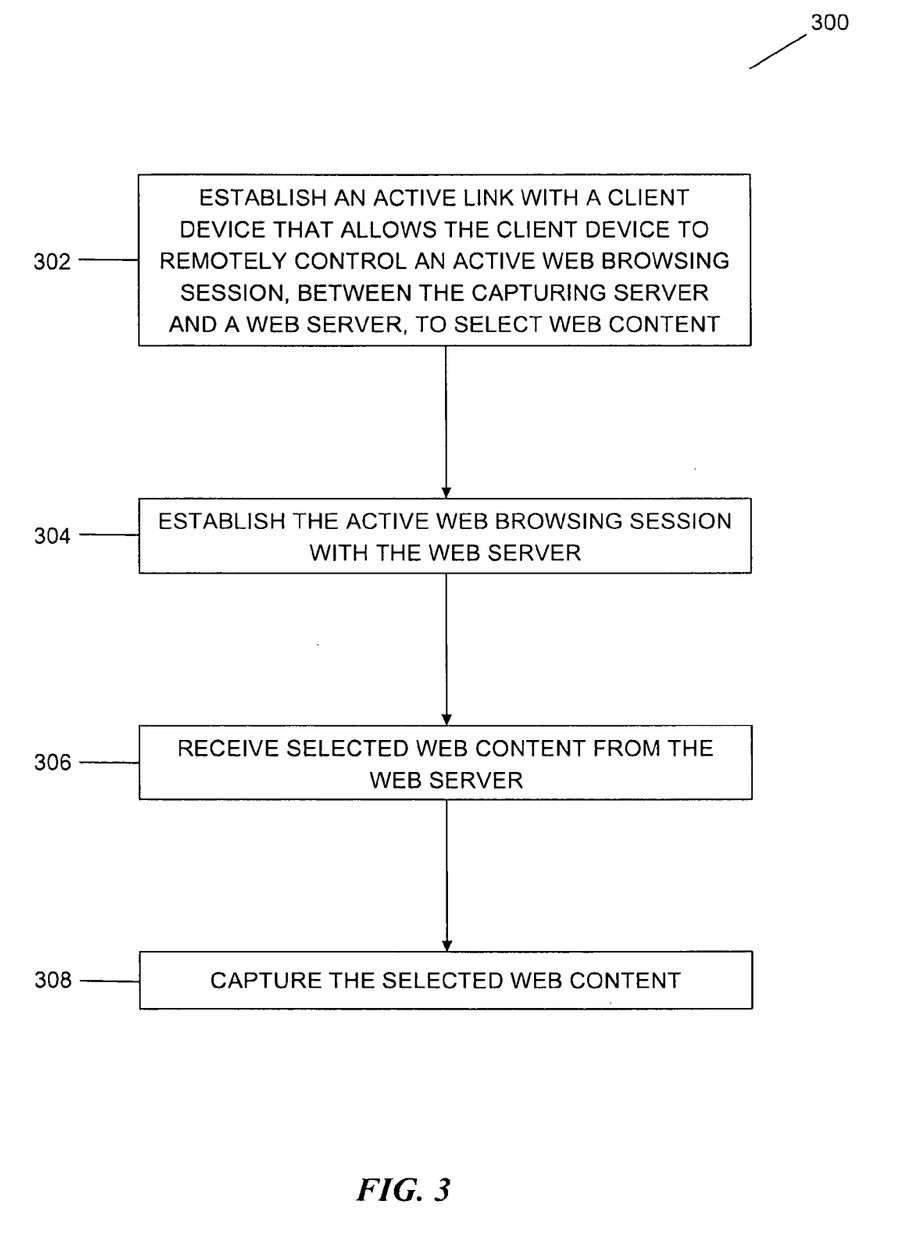
FIG. 3 is a logical flow diagram of a method for capturing web content in accordance with some embodiments of the present teachings.

Turning to FIG. 3, a logical flowchart is shown at 300 indicating the actions performed by the capturing server 102 in capturing web content using the first capture mechanism. The capturing server 102 establishes 302 the active link 128 with the client device 120 to allow the client device 120 to remotely control a web browsing session between the capturing server 102 and the web server 122. As indicated previously, the active link 128 is initiated by the capturing server 102 in one embodiment and initiated by the client device 120 in another embodiment. The active link 130 is initiated by the capturing server 102 to support the information interchange for the web browsing session the capturing server 102 establishes 304 with the web server 122.

The client device 120 remotely controls the web browsing session using a remote control protocol. For a particular embodiment, the client device 120 executes Remote Desktop Protocol (RDP), a proprietary control protocol developed by the Microsoft Corporation that provides a graphical interface, to control the web browsing session. Using the protocol, the client device 120 directs the capturing server 102, or more specifically, a web browser executing on the capturing server 102, to the web server 122. As the web browser navigates web content hosted by the web server 122, the capturing server 102 receives 306 selected web content from the web server 122 which the capturing server 102 captures 308, upon the request of the client device 120, by storing it to the non-volatile storage 116.

In a particular embodiment, the capturing server 102 applies at least one of an electronic signature, a hash function, or a time stamp to the captured web content. One philosophy of use is that an application of the present teachings will meet federal, state, and local evidentiary standards for legal proceedings. Rule 901 of the Federal Rules of Evidence (FRE), for example, states that "[t]o satisfy the requirement of authenticating or identifying an item of evidence, [a proponent of the evidence] must produce [supporting] evidence sufficient to support a finding that the item [of evidence] is what the proponent claims it is." FRE 901(b)(9) goes on to state that [supporting] "evidence that satisfies the requirement is [supporting] evidence describing a process or system and showing that it produces an accurate result." Through the application of specific functions and/or procedures to capture web content, the disclosed method for capturing web content from a web server properly identifies and authenticates the captured web content for use in judicial or other types of proceedings for which proffered web content must be validated.

For one embodiment, the capturing server 102, or another element of the capturing system 100, applies an electronic signature to the captured web content. An electronic signature, as defined herein, is any means of marking the captured web content to provide an indication that the capturing server 102, or any other portion of the capturing system 100, is the origin of the captured web content. For a particular embodiment, the electronic signature is a digital signature based on a cryptographic function that includes, for example, a private and a public key, used to authenticate the captured web content to which the electronic signature is applied. In a further embodiment, the capturing server 102 uses the electronic signature to provide non-repudiation.

For another embodiment, the capturing server 102, or another element of the capturing system 100, applies a hash function to the captured web content. A hash function, as defined herein, is the application of an algorithm to the captured web content that generates a unique string of data (a hash value) for the captured web content that changes if the captured web content is accidentally or intentionally changed. The hash value serves as a "digital fingerprint" for the captured web content and provides an indication of data integrity.

In a further embodiment, the capturing server 102, or another element of the capturing system 100, applies a timestamp to the captured web content. A timestamp, as defined herein, is an indication of when the web content was captured or last modified. Time-stamping the captured web content, for example, provides a "guarantee" that the captured web data was not altered since it was captured by the capturing server 102. For a particular embodiment, time-stamping is based on a public-key infrastructure (PKI). In a further embodiment, the capturing server 102 applies a timestamp to the web content at the time the web content is captured during the active web browsing session between the capturing server 102 and the web server 122.

In different embodiments, the timestamp indicates when the web content was requested, obtained, and/or captured to the non-volatile storage 116. For an active web browsing session, a timestamp can be used for each individual request for data to populate a webpage being displayed at the client device 120, whether those requests are directed to a single web server (e.g., web server 122) or to multiple web servers. A timestamp can also be used for each event (e.g., broken links, inaccessible servers, etc.) or action (e.g., clicks, swipes, etc.) that occurs during the active web browsing session. In other embodiments, the capturing server 102 uses additional cryptographic functions, independently or in conjunction with those specified here, to authenticate the captured web content.

In a first type of embodiment, the active web browsing session between the capturing server 102 and the web server 122 is established by transferring an active web browsing session between the client device 120 and the web server 122 to the capturing server 102. For example, the active web browsing session between the client device 120 and the web server 122 is transferred to the capturing server 102 by initiating a capture mode at the client device 120. Initiating a capture mode, as used herein, means to prepare, initialize, or make the capturing system 100 ready for the capture of web content from the web server 122 by the capturing server 102. Alternatively, in a second type of embodiment, the client device 120 does not transfer, but rather initiates the active web browsing session between the capturing server 102 and the web server 122 to initiate a capture mode and begin the capture of web content from the web server 122.

In an embodiment of the first type, a user of the client device 120 clicks a representation of a button (provided by a browser extension) displayed in a web browser (e.g., Mozilla Firefox) executing on the client device 120 to transfer the active web browsing session from the client device 120 to the capturing server 102. In doing so, the client device 120 initiates the active link 128. The capturing server 102, in turn, initiates the active link 130 to the web server 122 the client device 120 was browsing.

In a particular embodiment, transferring the web browsing session, the client device 120 sends the capturing server 102 the URL of the web server 122. In further embodiments, the client device 102 sends information in addition to the URL to allow the capturing server 102 to more closely replicate the web browsing session being transferred. If the user is logged into an account on the web server 122, such as a bank account or a social networking account, for example, then the client device 120 sends the capturing server 102 additional information, including credentials the client device 120 has accumulated during its web browsing session with the web server 122. In this way, the session is transferred to the capturing server 102 without being interrupted. In some instances, the web server 122 is spoofed into thinking it is still participating in a web browsing session with the client device 120. In other instances, however, as when the web server 122 uses ingress and/or egress filtering, the web server 122 recognizes that packets are no longer being received from and/or being sent to the same address (i.e., the address of the client device 120). The user then repeats the login procedure for his account from within the transferred web browsing session between the capturing server 102 and the web server 122.

Clicking the button provided by the browser extension also launches the RDP on the client device, allowing the client device 120 to direct a web browser (e.g., Internet Explorer) executing on the capturing server 102 to specific web content hosted by the web server 122. While the client device 120 is running the RDP, the user sees displayed on a screen of the client device 120 a representation of the web browser executing on the capturing server 102 within the web browser executing on the client device 120 (e.g., Internet Explorer displayed within Mozilla Firefox).

In an embodiment of the second type, regardless of any web browsing sessions, if any, that are active at the client device 120, the user double clicks an icon displayed on a desktop of an operating system running on the client device 120 to initiate the capture mode. The client device 120 launches a default web browser (or displays a prompt to select one), if needed, establishes the active link 128, and launches the RDP. When connecting with the capturing server 102, the user of the client device 120 receives a login prompt from the capturing server 102 to verify the user is a subscriber. The capturing server 102 establishes the active link 130 and a web browsing session, supported by the active link 130, with the web server 122 as the user uses the RDP to direct the capturing server 102 to web content hosted by the web server 122.

In another embodiment of the first or second type, a web browser is running on the client device 120 (first type) or the user launches one (second type). The user enters an IP address or a domain name into the browser to navigate to the capturing server 102 and initiate the capture mode. After logging in to the capturing server 102, the user is able to use the client device 120 to direct the capturing server 102 to capture web content hosted by the web server 122, or web content hosted by other web servers. As the client device 120 directs the capturing server 102 to a web server, the capturing server 102 establishes an active link with that web server to support an active web browsing session between the capturing server 102 and the web server to capture web content the user specifies.

While in capture mode, a subscriber logged onto the client device 120 is able to use the capturing system 100 to capture web content as he directs the capturing server 102 to the web content. The capturing server 102 receives the web content and forwards it to the client device 120 for display on the subscriber's desktop. In one embodiment, the subscriber instructs the capturing server 102 (e.g., by clicking a capture button) to capture specific web pages or embedded files the subscriber is viewing on his desktop. This places the capturing server in a "selective capture mode." The capturing server 102 receives the capture request from the client device 120 and captures the specific web content indicated in the request to the non-volatile storage 116.

In another embodiment, the subscriber instructs the capturing server 102 to capture all web content for a web browsing session or for a period of time. This places the capturing server 102 in a "capture-all mode." For example, the subscriber clicks a "capture all" button within a browser running on the desktop of the client device 120 to send a capture-all request to the capturing server 102. The capturing server, upon receiving the request, captures all the web content it navigates to, under the direction of the client device 120, until the web browsing session ends or the capturing server 102 receives a "stop capture" instruction from the client device 120.

For an embodiment, the capturing server 102 captures web content that includes deep web content, such as when the client device 120 directs the web server 102 to a user's bank or social networking account. In other embodiments, the web content the capturing server 102 captures is selected with a URL. For a particular embodiment, the capturing server 102 also captures expandable content associated with the URL. Expandable web content associated with a URL, as used herein, is web content that is not initially displayed in a web browser upon navigating the web browser to the URL. Rather, the expandable web content is shown upon a user performing an interaction with a webpage associated with the URL.

Where an "onMouseOver" script command is coded into the HTML for the webpage, for example, the user rolls over (with a mouse or other cursor device) a picture embedded in the webpage to expand a picture caption without leaving the webpage specified by the URL. Where an "onClick" script command is coded into the HTML for the webpage, for example, the user clicks on a button embedded in the webpage to show additional content without leaving the webpage specified by the URL. In one implementation, the capturing server 102 makes a single call (i.e., request) to the web server 122 to get all the web content associated with a URL, inclusive of the expandable web content. The expandable web content for the URL is stored in a cache memory of the capturing server 102 (e.g., the memory 106) until the user, using the RDP of the client device 120 during the active web browsing session, performs an action that selects the expandable web content, at which time the expandable web content is made available to the user.

For some embodiments, the capturing server 102 captures web content that includes a webpage and asynchronous data used to generate the webpage. Webpages with asynchronous web applications that use asynchronous JavaScript and XML (AJAX) development techniques, for example, make asynchronous data calls (requests) to the web server 122 in the background that may or may not update how the webpage is displayed. As used herein, asynchronous data is data that is accessed and/or retrieved intermittently or at irregular intervals rather than in a steady or continuous stream. For one embodiment, asynchronous data calls retrieve asynchronous data used to display additional content in the existing webpage without affecting the URL. In another embodiment, asynchronous data includes data retrieved using the JavaScript Object Notation (JSON) standard for data transmission. Asynchronous data may also include data received from the web server 122 in response to data calls from the capturing server 102 that are not asynchronous. In this instance, the data calls are made after the webpage (or portion of the webpage) is displayed to receive additional data for the purpose of displaying more content in the webpage without altering the URL. For additional embodiments, asynchronous data calls for a webpage result from a script being run by the webpage or from a user interacting with the web page (e.g., clicking a button within the displayed webpage).

In an embodiment, the capturing server 102 is directed by a user of the client device 120 to a Facebook page. As the user scrolls down the page, additional data calls are made by the capturing server 102 for asynchronous data that is used to show the additional content of the Facebook page being scrolled into view. All the data for the portion of the Facebook page the user viewed, received piecewise from the web server 122 using multiple data calls, is captured by the capturing server 102. In a further embodiment, the capturing server 102 captures all the web content for the Facebook page, as if the user had scrolled to the bottom, independently of how far down the page the user actually scrolls. For a specific embodiment, the capturing server 102 uses a timestamp for each asynchronous data call made to retrieve content for a webpage being displayed by the client device 120.

For a number of embodiments, the capturing server 102 captures web content inclusive of data that allows for a plurality of presentation formats for the captured web content. In different embodiments, these presentation formats are associated with different web browsers and/or operating systems. Some webpages are designed to display web content differently depending upon a device and/or browser used to display the content. Other webpages, independent of their design, appear differently as a consequence of a device, an operating system, and/or a web browser used to display them. For example, different cascading style sheets (CSSs) might be used for different web browsers, or CSS code might be hidden from older web browsers. Also, different web browsers follow different sets of standards, often causing the same webpage to appear differently in each web browser, even if the web content for the webpage is non-browser specific. Further, web content might be formatted to fit a smaller display, for instance, when mobile devices, like those running the Android operating system, are used to view the web content.

For an embodiment, the capturing server 102 captures data for web content representing a webpage that allows the webpage to be recreated as it would have appeared on different devices running different operating systems and/or browsers at the time of capture. From the captured web content stored in the non-volatile storage 116, for example, an authorized user (a party with proper login credentials) can view the webpage as it would have appeared when captured as displayed by a desktop computer running Windows 8 in Internet Explorer 10 or on a smartphone running Andriod 2.3 (Gingerbread).

In another embodiment, the capturing server 102 also captures metadata for the captured web content. Metadata is defined herein as data that describes or relates to captured web content. For example, metadata can specify the geographic location at which web content was captured when the capturing system 100 includes multiple capturing servers and/or non-volatile storage locations (e.g., the Memphis capturing server was used to capture the web content). Metadata can specify a web server from which web content was captured using a URL or an IP address. Metadata can also specify which subscriber logged into the capturing system 100 and directed the capturing server 102 to capture the web content. For a particular embodiment, the capturing server 102 captures metadata that specifies at least one of: a time for the captured web content; or a URL for the captured web content. The time for the captured web content can include a date and/or a time of day.

In a first embodiment, the time indicates the time the client device 120 or the capturing server 102 requested the web content. In a second embodiment, the time indicates the time the capturing server 102 received the requested web content. In a third embodiment, the time indicates the time the capturing server 102 captured the requested web content. For additional embodiments, the metadata includes times associated with asynchronous requests made to the web server 122 and/or the times of any other identifiable interactions occurring between the capturing server 102 and the web server 122 for which a time can be assigned.

In further embodiments, metadata captured by the capturing server 102 can include, but is not limited to: the IP address of the client device 102, the capturing server 102, the web server 122, and/or the non-volatile storage 116; the geographic location of the subscriber that captured the web content; what web browser was used by the capturing server 102 to capture the web content; what web browser was used by the client device 120 to direct the capturing server 102 to the captured web content; what states existed in one or more of the web browsers used (e.g., cookies, browser history, software patches installed, etc.); and what server hosted the capturing server 102 as a virtual machine (e.g., GCP, EC2, or Azure). Metadata for captured web content might also include a "surfing" history for a web browser indicating how the web browser arrived at the captured web content or the remotely controlled actions that directed the web browser to the web server 122 and the captured web content.

The actions performed by the web browser executing on the capturing server 102 are controlled remotely by the client device 120 during a web browsing session. For some embodiments, the capturing server 102 captures these remotely controlled actions in addition to the web content hosted by the web server 122. For a particular embodiment, the remotely controlled actions the capturing server 102 captures includes at least one of: a selection performed during the active web browsing session; a swipe performed during the active web browsing session; or a rollover performed during the active web browsing session. As a user of the client device 120 moves his mouse, for example, the RDP allows for a cursor to move within the browser executing on the capturing server 102. The cursor can swipe (or move) from one portion of a webpage displayed by the web browser to another. The cursor can make a selection as the user uses the RDP to click his mouse when the cursor is aligned with a button. Combining these two actions, the user can click on a scroll bar of the webpage and drag it to a different position. The user can also roll the cursor over an image or a portion of the webpage (perform a rollover) to display additional information on the image or to solicit another response from the webpage.

In an embodiment, these remotely controlled actions are captured with the web content that makes up the webpage hosted by the web server 122. The capturing server 102 captures both the information being sent to and received from the web server 122 to capture the web browsing session in its entirety. The captured content may be viewed later by playing it as a video, for example, as a Matroska (MKV) or a Moving Picture Experts Group (MPEG) MP4 video. In such a case, the video could show the webpage, the user's interactions with the webpage, and the results of the interactions. For example, the video might show the user scrolling to the bottom of the webpage, clicking on a link to an image, and the resulting image being displayed. A video might also serve as evidence and be played during a trial to demonstrate to a technically unsophisticated jury how a website was coded to respond to particular inputs.

Embodiments previously described in connection with the first capture mechanism illustrated by FIG. 3 are also applicable to the second and third capture mechanisms illustrated by FIGS. 4 and 5, respectively. For example, while using the second or third capture mechanisms, the capturing server 102 can capture asynchronous and expandable content, can capture a plurality of presentation formats, can capture metadata, can capture remotely controlled actions, and can apply cryptographic functions to captured web content, which can include deep web content and/or surface web content.

Figure 4:
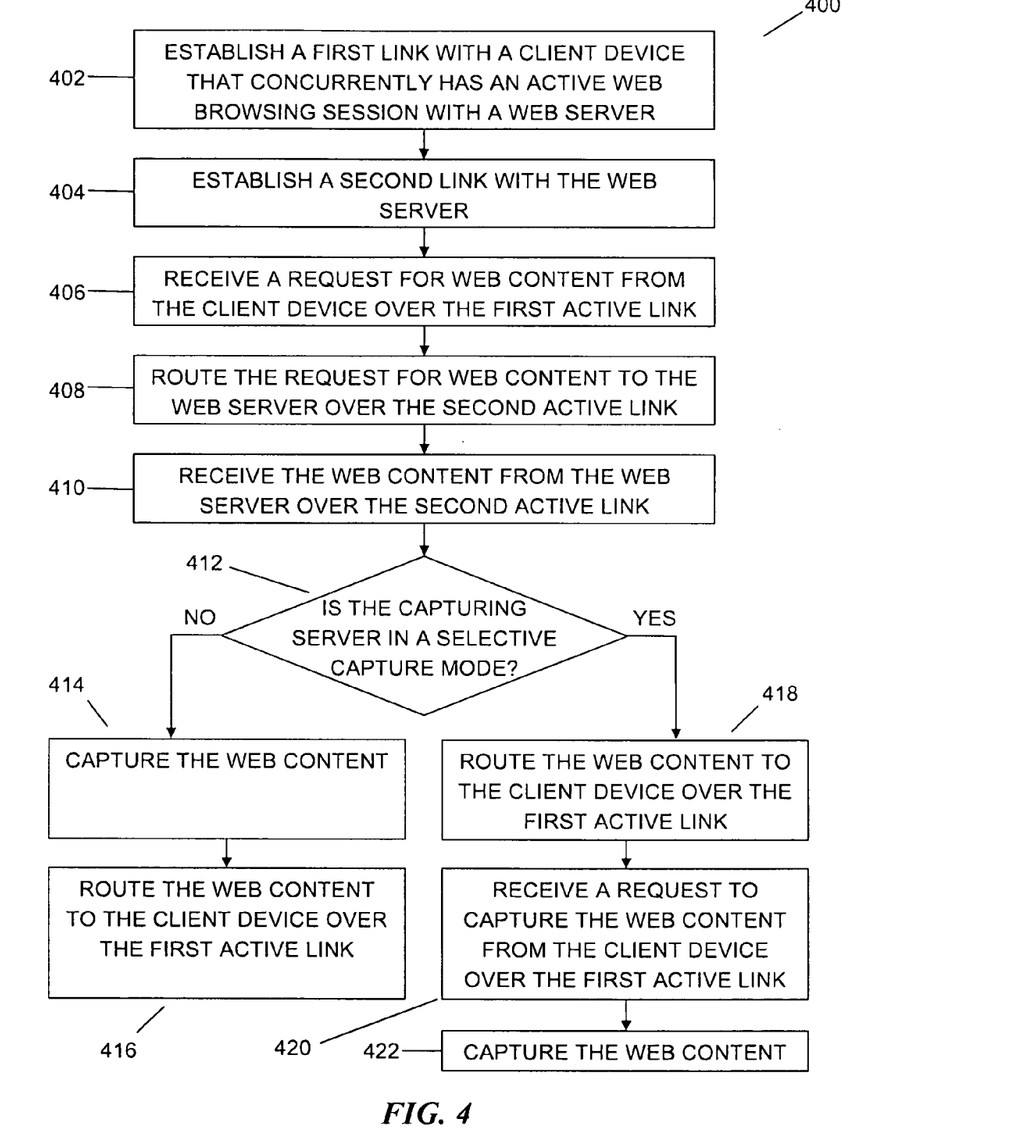
FIG. 4 is a logical flow diagram of a method for capturing web content in accordance with some embodiments of the present teachings.

Turning to FIG. 4, a logical flowchart is shown at 400 indicating the actions performed by the capturing server 102 in capturing web content using the second capture mechanism depicted in FIG. 2. More specifically, FIG. 4 shows the capturing server 102 establishing 402 the active link 128 with the client device 120 while the client device 120 is in an active web browsing session with the web server 122. In different embodiments, the establishment of the active link 128 may be initiated by the client device 120 or the capturing server 102. For example, the client device 120 initiates establishment of the active link 128 when a user of the client device 120 initiates a capture mode by clicking a button within a web browser or operating system running on the client device 120. Redirection software installed on the client device 120 or settings selected within the operating system of the client device 120 route traffic for the web browsing session between the client device 120 and the web server 122 through the capturing server 102 over the active link 128. From the vantage point of the client device 120, the capturing server 102 assumes a role analogous to a gateway or proxy server.

When the capture mode is initiated, the capturing server 102 also establishes 404 the active link 130 with the web server 122 so session traffic from and to the client device 120 can be routed to and from the web server 122, respectively. More specifically, the capturing server 102 receives 406 a request for web content from the client device 120 over the active link 128. The capturing server 102 routes 408 the request for the web content to the web server 122 over the active link 130, and in response to the request, receives 410 the web content from the web server 122 over the same link 130.

If the capturing server 102 determines 412 that it is in a selective capture mode, the capturing server 102 stores the web content it receives in the memory 106 before routing 418 the web content to the client device 120 over the active link 128 for display within the web browser executing on the client device 120. If a user viewing the web content on the client device 120 decides he wants to capture the web content he is viewing, he sends a capture request to the capturing server 102 over the active link 128. For a particular embodiment, the user initiates the capture request by clicking a capture button within the web browser he is using to view the web content. The capturing server 102 receives 420 the capture request from the client device 120 and responsively captures 422 the web content to the non-volatile storage 116. The capturing server 102 captures the web content from the memory 106 to maintain chain of custody for the captured web content.

If the capturing server 102 determines 412 that it is in a capture-all mode, the capturing server 102 captures 414 all the web content the capturing server 102 is directed to by the client device 120 without receiving specific capture requests. As the capturing server 102 receives 410 the web content from the web server 122 over the active link 130, it captures 414 the web content to the non-volatile storage 116 before routing 416 the web content to the client device 120 over the active link 128, to maintain chain of custody for the captured web content.

Figure 5:
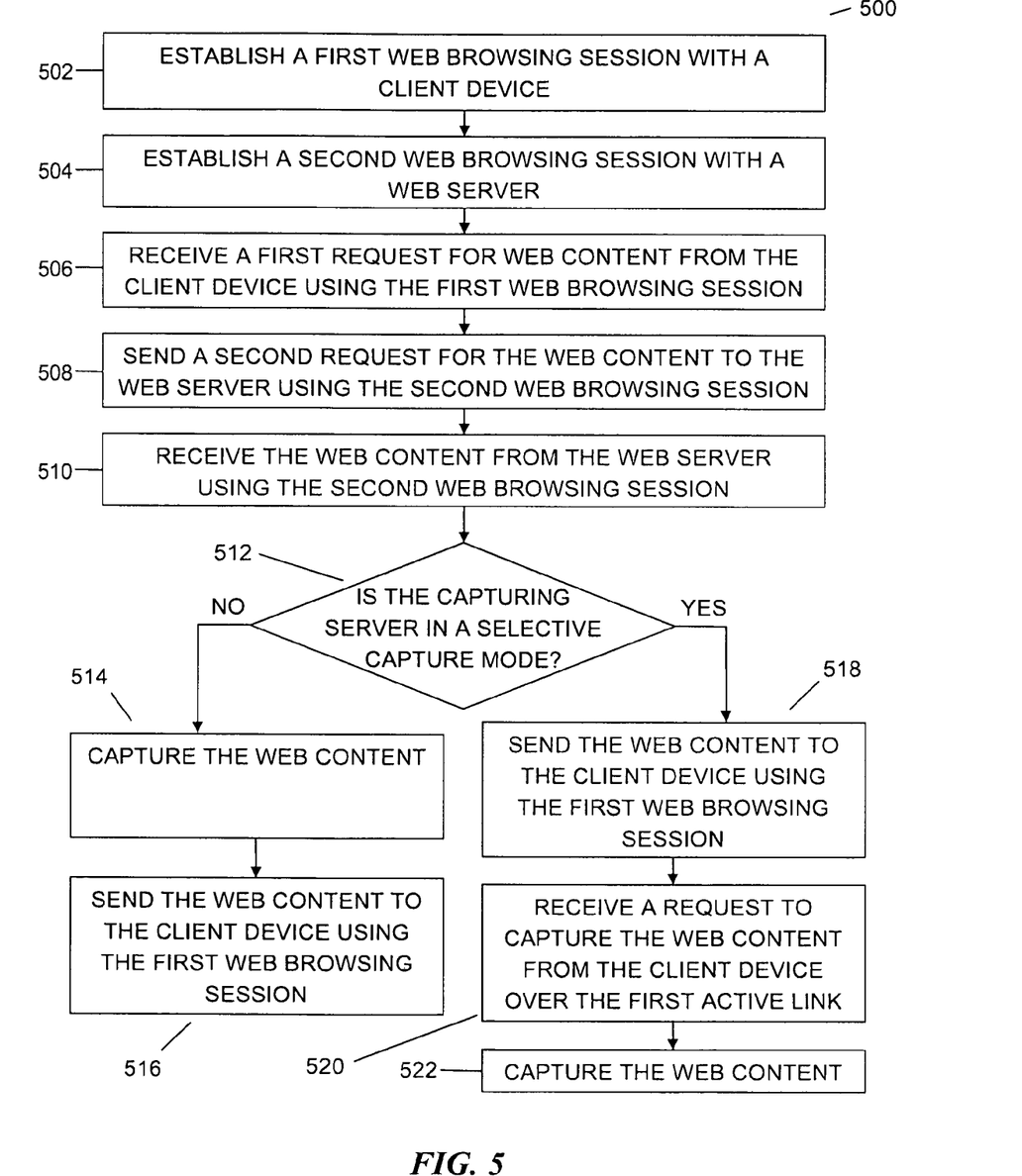
FIG. 5 is a logical flow diagram of a method for capturing web content in accordance with some embodiments of the present teachings.

Turning to FIG. 5, a logical flowchart is shown at 500 indicating the actions performed by the capturing server 102 in capturing web content using the third capture mechanism depicted in FIG. 2. More specifically, FIG. 5 shows the capturing server 102 establishing 502 the active link 128 with the client device 120 and establishing 504 the active link 130 with the web server 122 when the client device 120 initiates a capture mode while engaged in a web browsing session with the web server 122. In an alternate embodiment for the third capture mechanism, as for the first and second capture mechanisms, the client device 120 initiates the capture mode before a web browsing session between the client device 120 and the web server 122 is established.

The capturing server 102 also launches a web browser and a content server (not shown), as indicated with reference to FIG. 2, to establish a first web browsing session between a web browser executing on the client device 120 and the content server executing on the capturing server 102, and a second web browsing session between the web browser executing on the capturing server 102 and the web server 122. Web content received by the capturing server 102 from the web server 122 using the second web browsing session is hosted by the content server of the capturing server 102 for the client device 120.

The capturing server 102 receives 506 a first request for web content from the client device 120 using the first web browsing session. Responsively, the capturing server 102 sends 508 a second request to the web server 122 using the second web browsing session. Upon receiving 510 the web content from the web server 122, the capturing server 102 stores the web content to the memory 106 and hosts the web content, using the content server, for the client device 120 in response to the first request. The capturing server 102 launches the content server associated with the first web browsing session and hosts the web content received from the web server 122 on the content server so the client device 120 can download the web content from the content server.

For an embodiment, the capturing server 102 hosts the web content requested by the client device 120 and received by the capturing server 102 from the web server 122 on the content server with a unique identifier for the content server. For example, if the web server 122 is hosting the website www.acme.com from which a user of the client device 120 wishes to capture content, the capturing server 102, in hosting ACME's home page on the content server, prepends the hypertext links in the home page with the domain name for the content server (e.g., contentserver.com). A hypertext link embedded in ACME's home page for a products webpage, www.acme.com/products.asp, for instance, is hosted on the content server as www.contentserver.com/acme/products.asp. This allows the user to select the prepended hypertext links using the first web browsing session without being redirected to the web server 122. Similarly, the capturing server 102 prepends hypertext links embedded within the products webpage and hosts, using the content server, the web content to which the links point.

If the products webpage has any embedded files (e.g., images of listed products) and/or embedded hypertext links, then the capturing server 102 requests and receives those embedded files and/or the web content the embedded hypertext links point to from one or more web servers that are hosting the embedded files and/or linked web content. In a first embodiment, the web server 122 hosts the products webpage in addition to all the files embedded within the product webpage and all the web content to which any embedded hypertext links point. Therefore, the capturing server 102 can request and receive all the embedded files and linked web content for the products webpage from the web server 122. In a second embodiment, some of the embedded files and/or linked web content for the products webpage are not hosted by the web server 122 that hosts the products webpage. For this embodiment, the capturing server 102 requests and receives embedded files and/or linked web content for the products webpage from different web servers.

The capturing server 102 stores the products webpage along with any embedded files and linked web content to the memory 106. The capturing server 102 then recreates and hosts the products webpage using the content server. All the links for embedded files and linked content within the recreated products webpage are prepended so that the links point to the content server rather than the web servers from which the capturing server 102 originally received the content. The web browser of the client device 120 displays the recreated products webpage with the prepended hypertext links that redirect the client device 120 to the content server. As the user navigates the recreated products webpage with a web browser running on the client device 120, the displayed content is taken from the memory 106 of the capturing server. If the user sends a capture request for web content to the capturing server 102, then the capturing server 102 captures the web content from the memory 106. In this way, the content being viewed by the user is the content that is captured.

If the capturing server 102 determines 512 that is in a capture-all mode rather than in a selective capture mode, then the capturing server 102 captures 514 all the web content it receives from the web server 122 in the second web browsing session before sending 516 the web content to the client device 120 using the first web browsing session. If, however, the capturing server 102 determines 512 that is in a selective capture mode, then the capturing server 102 stores the web content it receives from the first web browsing session to the memory 106 before hosting the web content, using the content server, so that the content can be sent 518 to the client device 120 using the first web browsing session. If the user of the client device 120 wishes to capture web content upon receiving it from the capturing server 102, he sends a capture request to the capturing server 102 over the active link 128. When the capturing server 102 receives 520 the capture request, the capturing server 102 captures 522 the selected web content from the memory 106 to maintain chain of custody for the web content selected for capture.

Figure 6:
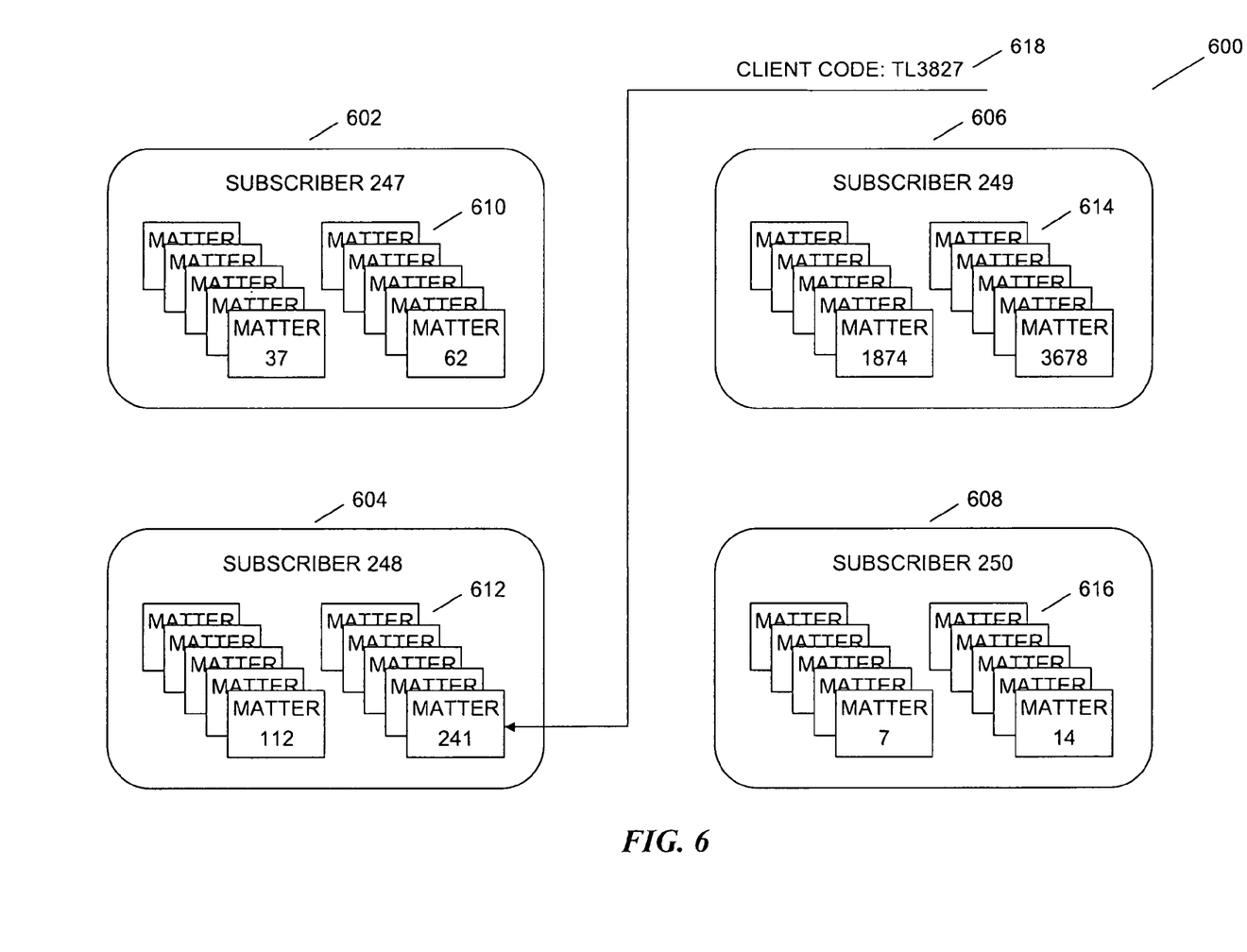
FIG. 6 is a schematic diagram for managing a directory structure for storing captured web content in accordance with some embodiments of the present teachings.

FIG. 6 shows a schematic diagram 600 illustrating functionality of the capturing system 100 related to the non-volatile storage 116. More specifically, the diagram 600 illustrates a method for managing a directory structure within the non-volatile storage 116 used to store captured web content in accordance with some embodiments of the present teachings. The diagram 600 shows a portion of the non-volatile storage 116 that is subdivided into four parts 602, 604, 606, 608 that are used for four different subscribers. Each part, in turn, is further subdivided into a plurality of subparts 610, 612, 614, 616.

For a particular embodiment, the parts 602, 604, 606, 608 and the subparts 610, 612, 614, 616 within each part represent a formatting of the portion of the non-volatile storage 116 into subscriber directories 602, 604, 606, 608 that include matter directories 610, 612, 614, 616. The capturing server 102 identifies a subscriber initiating a capture mode during a login procedure. Thereafter, the capturing server 102 stores captured web content requested by the subscriber to the subscriber's directory. Where the subscriber identifies a matter for the captured web content, the content is stored within the correct matter directory of the subscriber's directory. In a further embodiment, the non-volatile storage 116 is audited periodically to ensure a set of standards are met to ensure data integrity.

Client code 618, e.g., TL3827, is a unique identifier that points to a specific matter within a subscriber directory. For an embodiment, the processing element 104 within the capturing server 102 is configured to generate the client code 618 for a subscriber. Upon receiving the client code 618 from the client device 120, the capturing server 102 stores captured web content to a matter directory within a subscriber directory based on the client code. The capturing server 102, for example, generates the client code 618 for the subscriber, wherein the client code 618 has an expiration period. The expiration period of the client code 618 is a period of validity during which time the client code can be used as described herein. For an embodiment, the expiration period of the client code 618, or its period of validity, begins when the capturing server 102 generates the client code 618 and ends at an expiration time that the capturing server 102 determines. In a further embodiment, the subscriber specifies the expiration time.

For example, the subscriber is an attorney preparing a case for a client. While the client is not a subscriber to the capturing system 100, the client can access the system 100, during the expiration period, to capture web content related to the case by using the client code 618 provided to the client by the attorney. This way, the client can capture web content in the same way the subscriber can without assistance and need not divulge personal passwords to the subscriber, when, for instance, deep web content is needed in preparing the case (e.g., e-mails, bank statements, social networking content, etc.).

Upon receiving the client code 618 from the client device 120 over the active link 218, the capturing server 102 stores any web content captured by the client with an association to the subscriber (the attorney) and a matter (the case) based on the client code 618. In the case of subscriber and matter directories, the association is made when the capturing server 102 stores the captured web content to the matter directory 620, which represents the client's case, within the directory for subscriber 248, who is the client's attorney. After the expiration time for the client code 618, the client no longer has access to the capturing system 100 to capture web content to be stored in the subscriber's directory 620. The subscriber, however, can always access and view the captured web content stored in directory 620 or any of the other directories shown at 612 belonging to the subscriber.

In other embodiments, the attorney provides a client code 618 (or a more appropriately named code) to a co-counsel for a case, who may not be a subscriber to a capturing server utilizing the capturing system 100, or who may be a subscriber with his own subscriber directory that is separate from the case. For this embodiment, the client code 618 provides the co-counsel with access to the matter 620 and subscriber directory 604 for the case at hand, and thus with access to the captured web content. The co-counsel can browse the captured web content or print out a report with an affidavit for use in court. The client code 618 may also provide the co-counsel with the ability to capture web content with an association to a subscriber (e.g., lead counsel) and a matter (the case) directory. For one embodiment, a client and a co-counsel share a client code 618. Alternatively, in another embodiment, the client and the co-counsel are each presented with a separate client code, each of which was generated by the capturing server 102 for a specific subscribing attorney and case.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., including a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method performed by a non-first-user-operable capturing server for capturing web content from a web server, the method comprising:
   the capturing server:
   establishing an active link between a first-user-operable client device and the capturing server that allows the client device to remotely control an active web browsing session, between the capturing server and the web server, to select web content;
   establishing the active web browsing session between the capturing server and the web server;
   receiving the web content from the web server without the web content being routed through the client device; and
   capturing the web content to a non-first-user-operable non-volatile storage device, remote from the client device, for later retrieval on a future date, wherein the captured web content is blocked from being changed by the client device while the captured web content is stored on the non-volatile storage device.

2. The method of claim 1 further comprising applying to the captured web content at least one of:
   an electronic signature;
   a hash function; or
   a timestamp.

3. The method of claim 1, wherein the web content comprises deep web content.

4. The method of claim 1, wherein the web content is selected with a uniform resource locator and captured to include expandable content associated with the uniform resource locator.

5. The method of claim 1, wherein the captured web content comprises a webpage and asynchronous data used to generate the webpage.

6. The method of claim 1, wherein the captured web content comprises data that allows for a plurality of presentation formats for the captured web content, wherein a presentation format is associated with at least one of:
   a web browser; or
   an operating system.

7. The method of claim 1 further comprising capturing remotely controlled actions performed during the active web browsing session.

8. The method of claim 7, wherein capturing the remotely controlled actions performed during the active web browsing session comprises capturing at least one of:
   a selection performed during the active web browsing session;
   a swipe performed during the active web browsing session; or
   a rollover performed during the active web browsing session.

9. The method of claim 1 further comprising:
   receiving over the active link from the client device a client code; and
   storing the captured web content with an association to a subscriber and a matter based on the client code.

10. The method of claim 9 further comprising generating the client code for the subscriber, wherein the client code has an expiration period.

11. The method of claim 1, wherein establishing the active web browsing session between the capturing server and the web server comprises transferring an active web browsing session between the client device and the web server to the capturing server.

12. The method of claim 11, wherein the active web browsing session between the client device and the web server is transferred to the capturing server by initiating a capture mode at the client device.

13. The method of claim 1 further comprising capturing metadata that specifies at least one of:
   a time for the captured web content; or
   a uniform resource locator for the captured web content.

14. A method performed by a non-first-user-operable capturing server for capturing web content from a web server, the method comprising:
   the capturing server:
   establishing a first active link between the capturing server and a first-user-operable client device that concurrently has an active web browsing session with the web server;
   establishing a second active link between the capturing server and the web server;
   receiving a request for web content from the client device over the first active link, wherein the web content was selected using the active web browsing session;
   routing the request for the web content to the web server over the second active link;

receiving the web content from the web server over the second active link without the web content being routed through the client device;

capturing the web content to a non-first-user-operable non-volatile storage device, remote from the client device, for later retrieval on a future date, wherein the captured web content is blocked from being changed by the client device while the captured web content is stored on the non-volatile storage device; and routing the web content to the client device over the first active link.

15. A method performed by a non-first-user-operable capturing server for capturing web content from a web server, the method comprising:

the capturing server:

establishing a first web browsing session between a first-user-operable client device and the capturing server;

establishing a second web browsing session between the capturing server and the web server, wherein the first and second web browsing sessions are running simultaneously;

receiving a first request for web content from the client device using the first web browsing session, wherein the web content is stored on the web server;

sending a second request for the web content to the web server using the second web browsing session;

receiving the web content from the web server using the second web browsing session;

capturing the web content to a non-first-user-operable non-volatile storage device, remote from the client device, for authorized retrieval on a future date, wherein the captured web content is blocked from being changed by the client device while the captured web content is stored on the non-volatile storage device;

applying at least one security measure to the captured web content, wherein the at least one security measure is designed to maintain integrity of the captured web content, prevent tampering with the captured web content, or guard against corruption of the captured web content; and sending the web content to the client device using the first web browsing session.

16. The method of claim 15 further comprising launching a content server associated with the first web browsing session and hosting the web content received from the web server on the content server, wherein sending the web content to the client device comprises the client device downloading the web content from the content server.

17. The method of claim 16 further comprising prepending uniform resource locators for the web content received from the web server and hosted on the content server with a unique identifier for the content server.

18. A system for securely capturing web content, the system comprising:

a non-first-user-operable capturing server comprising:

at least one network interface configured to establish a first active link between the capturing server and a first-user-operable client device and a second active link between the capturing server and a web server, wherein the second active link is used for receiving web content requested in real time using the client device;

a processing element configured to capture the web content using a capture mechanism comprising at least one of:

a remote control protocol implemented over the first active link that enables the client device to remotely control a first web browsing session between the capturing server and the web server; or a second web browsing session established between the client device and the web server over the first and second active links; and non-first-user-operable non-volatile storage configured to store the captured web content remotely from the client device for later retrieval on a future date, wherein the captured web content is blocked from being changed by the client device while the captured web content is stored on the non-volatile storage device.

19. The system of claim 18 further comprising an initiating server configured to initialize the capturing server and to provide a set of identifiers to at least one of the capturing server, the client device, or the non-volatile storage, the set of identifiers configured to allow establishment of the first active link, between the capturing server and the client device, and a third active link, between the capturing server and a portion of the non-volatile storage.

20. The system of claim 18, wherein the non-volatile storage is formatted to include subscriber directories that include matter directories, and wherein the processing element is configured to generate a client code and, upon receiving the client code from the client device, to store the captured web content to a matter directory within a subscriber directory based on the client code.

* * * * *